UNITED STATES PATENT OFFICE.

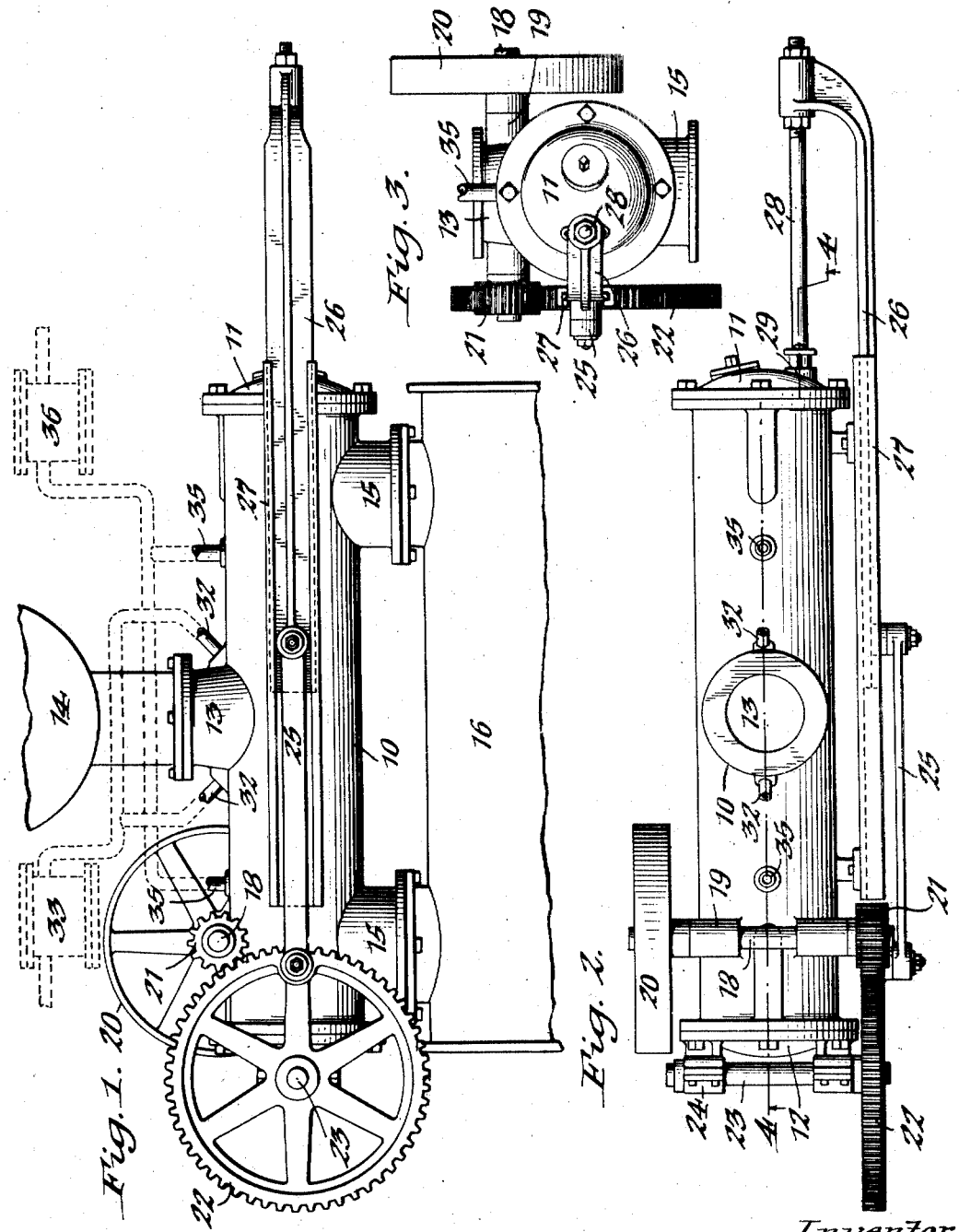

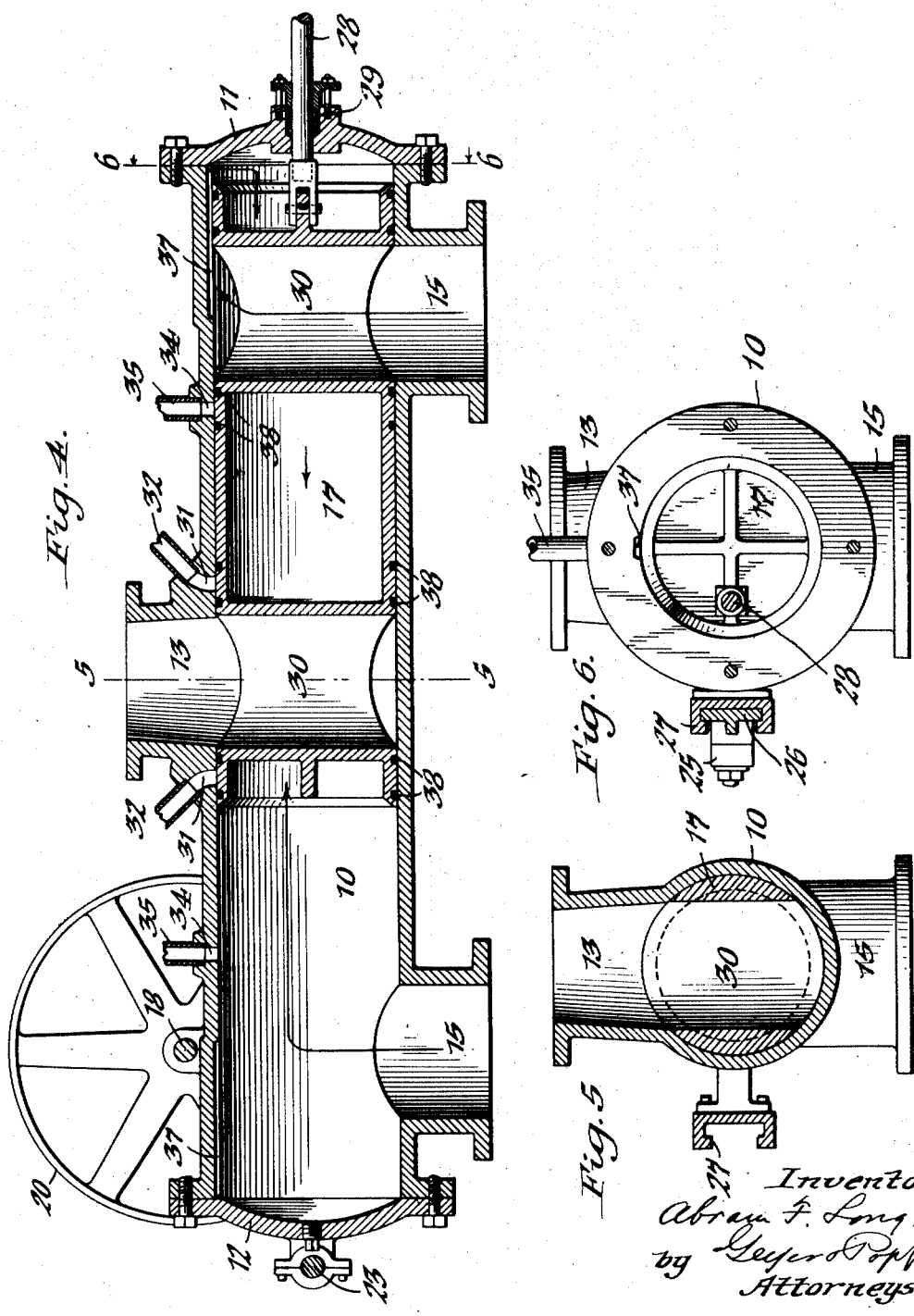

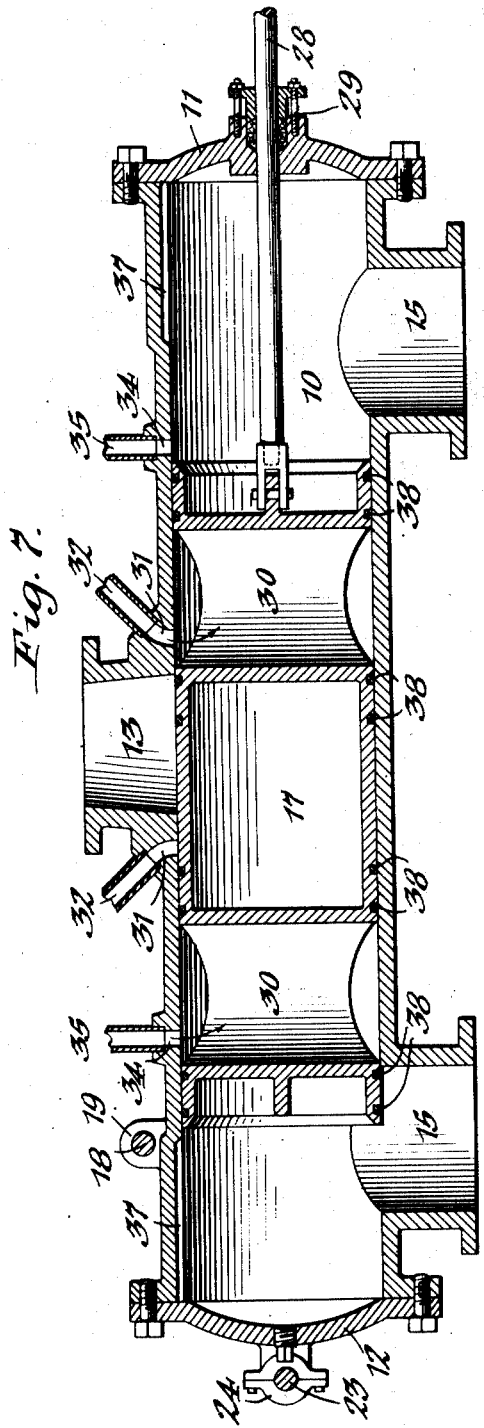

ABRAM F. LONG, OF BUFFALO, NEW YORK.

CONVEYING-VALVE.

1,396,859.   Specification of Letters Patent.   Patented Nov. 15, 1921.

Application filed April 4, 1921.  Serial No. 458,621.

*To all whom it may concern:*

Be it known that I, ABRAM F. LONG, a citizen of the United States, residing at Buffalo, in the county of Erie and State of New York, have invented new and useful Improvements in Conveying-Valves, of which the following is a specification.

This invention relates to a conveying valve which is employed in connection with vacuum drying apparatus and the like for conveying or feeding material from one chamber to another of different pressures without changing the pressure in either.

One object of the invention is to provide a conveying valve of this character which is balanced at all times, thus insuring its free operation.

A further object is the provision of means whereby the pressures in the supply and receiving chambers of the apparatus to which this valve is connected are kept constant.

A still further object is to provide a conveying valve of this type which is simple in construction and reliable and efficient in operation.

In the accompanying drawings:

Figure 1 is a side elevation of the valve, showing the supply and receiving chambers connected therewith, the pressure tanks being shown by dotted lines. Fig. 2 is a top plan view thereof. Fig. 3 is an end view of the same. Fig. 4 is an enlarged longitudinal section on line 4—4, Fig. 2. Figs. 5 and 6 are transverse sections on the correspondingly numbered lines in Fig. 4. Fig. 7 is a view similar to Fig. 4, showing the valve in a different position.

Similar characters of reference indicate corresponding parts throughout the several views.

10 represents the valve casing which is preferably in the form of a cylinder and arranged in a horizontal position relatively to the apparatus with which it is used. The ends of the valve casing are provided with suitable heads 11, 12 which are bolted or otherwise secured thereto. Disposed substantially centrally on the upper side of this casing is an inlet nipple or passage 13, preferably of upwardly tapering form, as shown in Fig. 4, which is connected with a supply chamber or container 14, as shown in Fig. 1. Located at each end of the valve casing and depending from the lower side thereof is an outlet nipple or passage 15, preferably of cylindrical form which is connected with a receiving chamber 16, as shown in Fig. 1. The supply chamber and receiving chamber may be under the same or different pressures, for example, one may be under atmospheric pressure and the other under a vacuum or vice versa. The material is conveyed from the supply chamber to the receiving chamber by means which will be presently described.

17 represents a slide valve or conveying valve which is preferably in the form of a trunk piston and which reciprocates longitudinally in the valve casing 10 for conveying the material from the inlet passage to ther outlet passage thereof. Any suitable means may be employed for reciprocating the valve, the means illustrated in the drawings, Figs. 1 and 2, by way of example, comprising a drive shaft 18 journaled in bearings 19 and having at one end thereof a pulley 20 connected with any suitable source of power for rotating it. The other end of this shaft is provided with a pinion 21 which meshes with a gear wheel 22 mounted on a countershaft 23 journaled in bearings 24 carried by the valve casing. A rod 25 is connected at one end to the gear wheel and at its other end to a slide 26 movable in a guide or way 27. Adjustably connected to the free end of said slide is the valve rod or stem 28 which passes through a stuffing box 29 in the head 11 of the valve casing.

This slide valve is provided near either end thereof with a vertical or transverse pocket or opening 30, preferably of cylindrical form, for receiving the material from the inlet passage 13 and discharging it into one or the other of the outlet passages 15 of the valve casing. These pockets extend completely through the valve body from one side thereof to the other and are so spaced relatively to each other, that when one is in alinement with the inlet passage of the valve casing, the other is in alinement with either one or the other of the outlet passages.

In order to prevent the slide valve from rotating within its casing and destroying the proper alinement or register of the pockets 30 with the passages 13 and 15, the valve rod 28 is eccentrically connected to the valve, as shown in Figs. 2, 3 and 6.

In an apparatus of this character it is necessary that the pressures in the supply and receiving chambers remain constant as the material is conveyed from one chamber to the other and that no leakage occurs between them. For this purpose, equalizing ports 31 are located adjacent to and on opposite sides of the inlet passage 13 of the valve casing 10. These ports are connected by pipes or conduits 32 with a pressure tank 33 shown by dotted lines in Fig. 1, which is maintained at a pressure equal to that in the supply chamber 14. Likewise equalizing ports 34 are located adjacent to the ends of the valve casing, a suitable distance in advance of the discharge passages 15 thereof, as shown in Fig. 4. Each of said ports 34 is connected by a pipe or conduit 35 with a pressure tank 36, shown by dotted lines in Fig. 1, which is maintained at a pressure equal to that in the receiving chamber 16. The tanks 33 and 36 may be connected with pumps or any other suitable source of pressure.

By this arrangement, before or preparatory to either pocket being moved into communication with either of the inlet or discharge passages of the valve casing, it is brought into register with the corresponding equalizing ports 31 or 34, as shown in Fig. 7, and placed under the same pressure as that existing in the respective supply or receiving chamber, thereby preventing a change of pressure in the latter and at the same time equalizing the pressure in each pocket with that in the respective chamber, so as to permit the material to be emptied from one chamber into the other by gravity.

In order to properly balance the valve within its casing, so that it will reciprocate freely therein and not be called upon to work against atmospheric or other pressures, both ends of said valve are exposed to the same pressure. For this purpose, by-passes 37 are provided at opposite ends of the valve casing. When the valve is at either end of its stroke, the by-pass 37 at the front end of the valve communicates with the receiving chamber 16 through the front pocket 30 of the valve and corresponding discharge passage 15 in the casing, while the other end of said valve is directly exposed to the pressure in the other discharge passage, as shown by the arrows in Fig. 4. As shown in Fig. 4, the by-passes are formed in the valve-casing and each by-pass extends inwardly from a point beyond the limit of the stroke of the valve to a point substantially opposite the discharge passage 15 at the corresponding end of the valve casing, thus subjecting that end of the valve to the same pressure as its opposite end.

The valve is provided with a plurality of sets of packing rings 38 which prevent leakage of air between the valve and cylinder and thereby keep the valve properly balanced in its casing. Each set of packing rings is so spaced that in either extreme position of the valve, the rings of each set are located on opposite sides of both ports 31 and the port 34 in the advance end of the cylinder, as shown in Fig. 4, preventing leakage of air from these ports into the valve casing or vice versa.

The operation of the conveying valve is as follows:

Assume power to be applied to the pulley 20 so as to reciprocate the valve in its casing, and also that it is desired to convey material from the supply chamber at atmospheric pressure into the receiving chamber below atmospheric pressure or in a vacuum. When the valve reaches the right hand end of its stroke, as shown in Fig. 4, the pressure in the pocket 30 at the rear end of the valve is the same as that in the supply chamber, said pocket having just passed the port 31 which is connected with the tank 33 under the same pressure as that in said supply chamber. The pressure in the latter and said pocket being equalized, the material drops by gravity into said valve pocket, and upon the return stroke of the valve (see arrow Fig. 4), the material is conveyed to the discharge passage 15 at the opposite end of the valve casing. Before the valve reaches the end of its return stroke and before its pocket 30 registers with the discharge passage 15, the pressure in said pocket is equalized with that in the receiving chamber by said pocket first communicating with the respective port 34, which as previously described, is connected with the tank 36 under the same pressure as that in said receiving chamber. As soon as the valve pocket registers with said discharge passage, the material drops by gravity into the receiving chamber. While material is being discharged from the pocket at the advancing end of the valve, the pocket at the other end thereof is being filled with material. Upon the next return stroke of the valve, the material in the front pocket thereof is conveyed to the corresponding discharge passage 15 at the front end of the valve casing, while the rear pocket is brought opposite the inlet passage 13, at which time the respective valve pockets are emptied and filled in an obvious manner.

In thus conveying material from one chamber of a given pressure to another of a different pressure, the pressure in each chamber remains the same and is not affected by the movement of the valve from the inlet passage to the discharge passage. Furthermore, by having the valve balanced, its resistance is reduced to a minimum, enabling a maximum amount of material to be conveyed with a given amount of power.

While a greater amount of material can be conveyed in a given time by providing two valve pockets and two discharge passages, it will be understood that, if desired, only one of said valve pockets 30 and a single discharge passage 15 need be employed to produce the desired results.

I claim as my invention:

1. A conveying valve, comprising a casing having an inlet passage and an outlet passage, said passages being adapted to communicate with supply and receiving chambers under the same or different pressures, a slide valve movable lengthwise in said casing and provided with a pocket for receiving material arranged to register alternately with said inlet and outlet passages, said casing having an equalizing port arranged adjacent each of said passages, said equalizing ports adapted to communicate with a source of pressure equal to that existing in the respective supply and receiving chambers.

2. A conveying valve, comprising a casing having an inlet passage, an outlet passage and an equalizing port arranged adjacent each passage, said passages being adapted to communicate with supply and receiving chambers under the same or different pressures, a slide valve movable lengthwise in said casing and provided with a pocket for conveying material from said inlet passage to said outlet passage, said pocket being arranged to register with one of said ports preparatory to registering with the corresponding inlet or outlet passage, said equalizing ports adapted to communicate with a source of pressure equal to that existing in the respective supply and receiving chambers.

3. A balanced conveying valve, comprising a valve-casing having an inlet passage and an outlet passage on opposite sides thereof, one of said passages adapted for connection with a supply chamber at a given pressure and the other with a receiving chamber at a different pressure, a slide valve arranged within said casing and provided with a transverse pocket for receiving material to be conveyed, said pocket being arranged to register alternately with said inlet and outlet passages, and said casing having ports located adjacent the inlet and discharge passages thereof and adapted to communicate with a source of pressure equal to that existing in the supply chamber and receiving chamber, respectively.

4. A balanced conveying valve comprising a valve casing having an inlet passage and an outlet passage, one of said passages being adapted for connection with a supply chamber at a given pressure and the other with a receiving chamber at a different pressure, a slide valve arranged within said casing and provided with a pocket for receiving material to be conveyed, said pocket being arranged to register alternately with said inlet and outlet passages, said casing having ports one of which is adapted to communicate with a source of pressure equal to that existing in said supply chamber, and the other of said ports adapted to communicate with a source of pressure equal to that existing in said receiving chamber, said valve pocket being adapted to communicate successively with said ports preparatory to registering with said inlet and outlet passages, respectively, and means for establishing communication between the ends of said valve casing and one or the other of said chambers, whereby the valve is balanced in said casing.

5. A balanced conveying valve, comprising a valve casing having a centrally disposed inlet passage and two oppositely disposed outlet passages arranged at opposite ends of said casing, said inlet passage being adapted for connection with a supply chamber and said outlet passages for connection with a receiving chamber, said chambers being at different pressures, a slide valve movable lengthwise in said casing and having a pocket near either end thereof for receiving material to be conveyed, said pockets being arranged to register successively with said inlet passage and alternately with said outlet passages, and means for equalizing the pressures in said pockets to the pressures existing in the respective supply and receiving chambers before said pockets register with the corresponding inlet and supply passages.

6. A balanced conveying valve, comprising a valve casing having a centrally disposed inlet passage and two oppositely disposed outlet passages arranged at opposite ends of said casing, said inlet passage being adapted for connection with a receiving chamber, said chambers being at different pressures, a slide valve movable lengthwise in said casing and having a pocket near either end thereof for receiving material to be conveyed, said pockets being arranged to register successively with said inlet passage and alternately with said outlet passages, and means for equalizing the pressures in said pockets to the pressures existing in the respectively supply and receiving chambers before said pockets register with the corresponding inlet and supply passages, said means including two independent sources of pressure, one equal to the pressure existing in the supply chamber and the other to the pressure in the receiving chamber, said valve casing being provided with equalizing ports adjacent said inlet and outlet passages, and conduits connecting said ports with said sources of pressure, respectively.

7. A conveying valve, comprising a casing having an inlet passage and an outlet passage, a slide valve arranged within said casing and provided with a pocket for receiving material to be conveyed, said pocket being arranged to register alternately with said inlet and outlet passages, and an actuating member connected to said valve eccentrically to the axis thereof.

8. A conveying valve, comprising a casing having an inlet passage and an outlet passage, a slide valve arranged within said casing and provided with a pocket for receiving material to be conveyed, said pocket being arranged to register alternately with said inlet and outlet passages, and a valve rod connected to said valve eccentrically to the axis thereof, and means for actuating said valve.

ABRAM F. LONG.